US008825949B2

(12) United States Patent
Sundrani

(10) Patent No.: US 8,825,949 B2
(45) Date of Patent: Sep. 2, 2014

(54) LOCKING IN RAID STORAGE SYSTEMS

(75) Inventor: Kapil Sundrani, Bareilly (IN)

(73) Assignee: LSI Corporation, San Jose, CA (US)

( * ) Notice: Subject to any disclaimer, the term of this patent is extended or adjusted under 35 U.S.C. 154(b) by 1016 days.

(21) Appl. No.: 12/321,044

(22) Filed: Jan. 15, 2009

(65) Prior Publication Data

US 2010/0180076 A1 Jul. 15, 2010

(51) Int. Cl.
*G06F 13/00* (2006.01)

(52) U.S. Cl.
USPC .......... 711/112; 711/167; 711/E12.002; 711/E12.103; 710/6; 710/36; 710/58

(58) Field of Classification Search
USPC .......... 711/112, 167, E12.002, E12.103; 710/6, 36, 58
See application file for complete search history.

(56) References Cited

U.S. PATENT DOCUMENTS

| | | | | |
|---|---|---|---|---|
| 5,530,948 A * | 6/1996 | Islam | ............................ | 714/6.12 |
| 6,195,727 B1 * | 2/2001 | Islam et al. | .................... | 711/114 |
| 6,219,751 B1 * | 4/2001 | Hodges | ....................... | 711/114 |
| 6,542,960 B1 * | 4/2003 | Wong et al. | .................... | 711/114 |
| 7,353,423 B2 * | 4/2008 | Hartline et al. | .............. | 714/6.21 |
| 7,529,902 B2 * | 5/2009 | Thangaraj et al. | ............. | 711/163 |
| 2008/0222214 A1 * | 9/2008 | Tokuda et al. | ................. | 707/202 |

* cited by examiner

*Primary Examiner* — Edward Dudek, Jr.
(74) *Attorney, Agent, or Firm* — Suiter Swantz pc llo

(57) ABSTRACT

A method for regulating I/O requests in a RAID storage system may comprise: receiving a first request to access a first set of one or more logical block addresses (LBAs) of a RAID volume; receiving a second request to access at least one of the first set of one or more LBAs of the RAID volume; and queuing the second request. A system for regulating I/O requests in a RAID storage system may comprise: means for receiving a first request to access a first set of one or more logical block addresses (LBAs) of a RAID volume; means for receiving a second request to access at least one of the first set of one or more LBAs of the RAID volume; and means for queuing the second request.

5 Claims, 6 Drawing Sheets

LOCKING IN RAID STORAGE SYSTEMS

BACKGROUND

A redundant array of inexpensive disks (RAID) storage subsystem may be responsible for management, processing and storage for input/output (I/O) requests from one or more hosts attached to the subsystem. While processing multiple requests simultaneously, it is desirable that the storage subsystem maintains integrity of data while processing host requests in a reasonable amount of time. One approach to ensuring data integrity is locking.

For example, in order to ensure that multiple host I/O requests do not conflict, locking solutions may lock (e.g. make the RAID volume inaccessible to more than one host) an entire logical RAID volume while one I/O request is being processed by a RAID controller. In another approach, locking may be on RAID stripe basis where an entire stripe is locked while an I/O request is being processed by a RAID controller. Locking may ensure that a host I/O request that accesses or updates data maintained on the RAID volume is completed without compromising on the integrity of data involved.

Further, RAID arrays involve an implicit parity generation for writes initiated by a host. Such parity generation operations require associated parity reads/writes across a given RAID stripe for which a write operation has occurred.

SUMMARY

Methods and systems for controlling access to a RAID storage system are presented.

A method for regulating I/O requests in a RAID storage system may comprise: receiving a first request to access a first set of one or more logical block addresses (LBAs) of a RAID volume; receiving a second request to access at least one of the first set of one or more LBAs of the RAID volume; and queuing the second request.

A system for regulating I/O requests in a RAID storage system may comprise: means for receiving a first request to access a first set of one or more logical block addresses (LBAs) of a RAID volume; means for receiving a second request to access at least one of the first set of one or more LBAs of the RAID volume; and means for queuing the second request.

It may be to be understood that both the foregoing general description and the following detailed description may be exemplary and explanatory only and may be not necessarily restrictive of the claims. The accompanying drawings, which may be incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
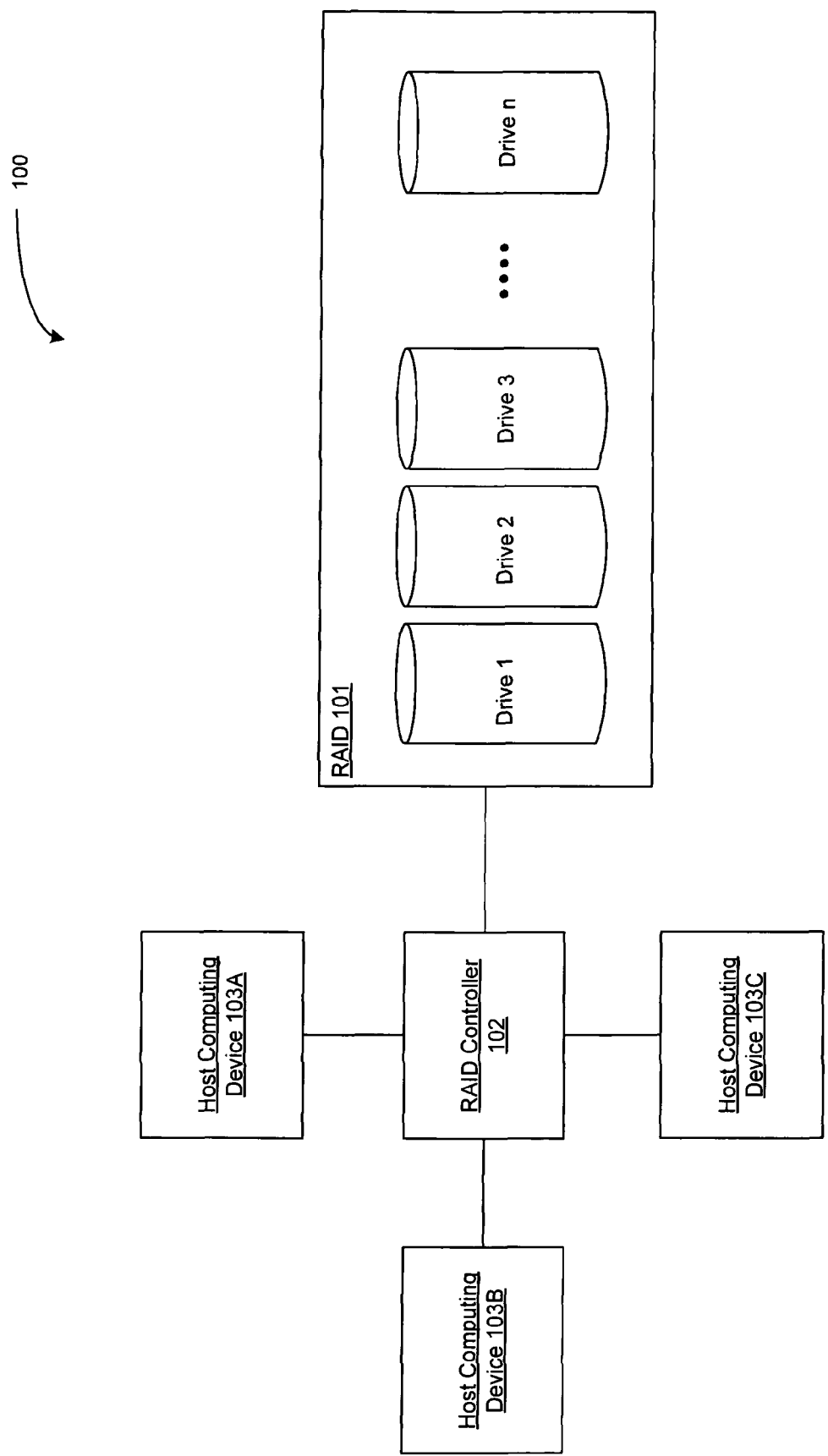
FIG. 1 shows a high-level system diagram for a RAID.

In the following detailed description, reference may be made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates a RAID storage system 100. The RAID storage system 100 may include a RAID volume 101, a RAID controller 102, and one or more host computing devices 103. The RAID volume 101 may include n+1 physical drives (e.g. Drive 0-Drive n).

Figure 2:
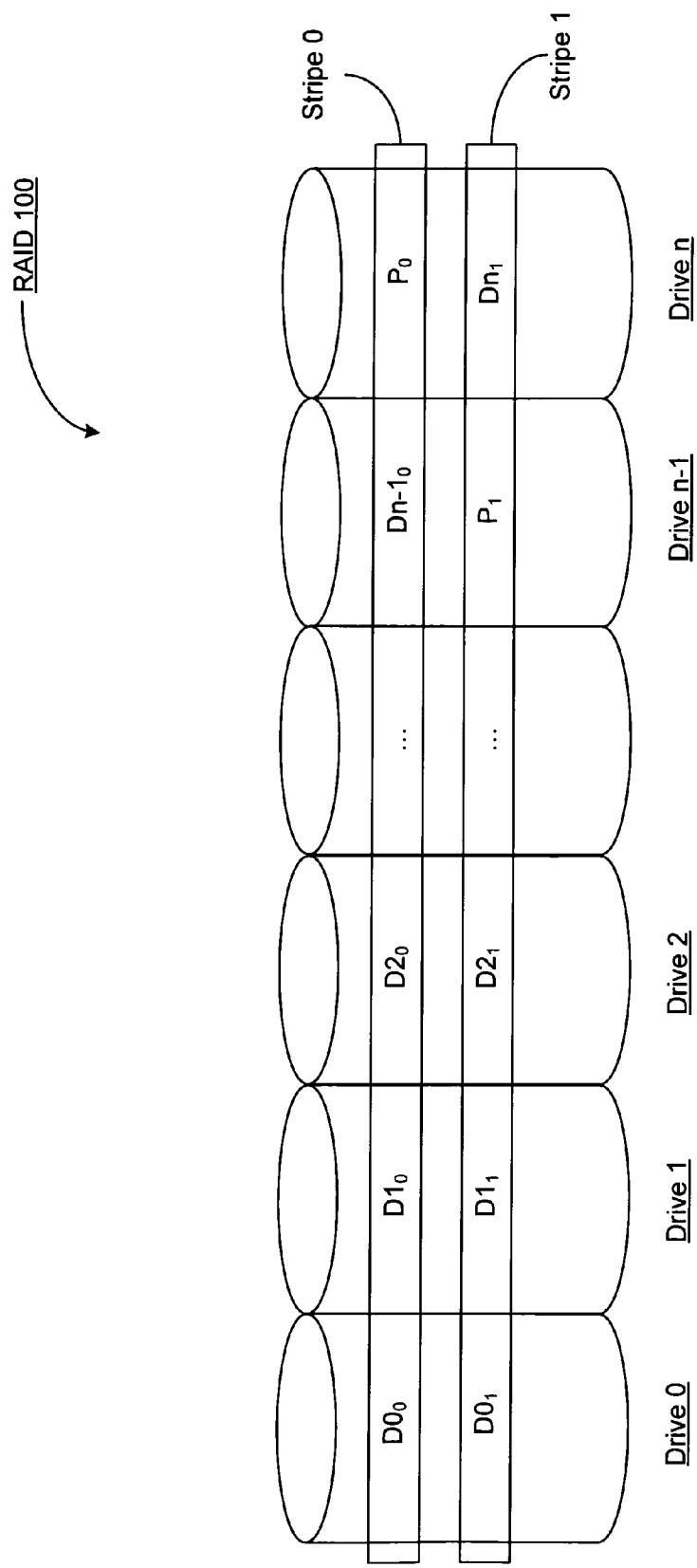
FIG. 2 shows a high-level system diagram for a RAID.

Referring to FIG. 2, the physical drives may be partitioned into one or more data strips (e.g. $D0_0$, $D1_0$, $D2_0$ . . . $Dn\text{-}1_0$; $D0_1$, $D1_1$, $D2_1$ . . . $Dn_1$). A data strip may include a collection of physical logical block addresses (LBAs) on a given physical drive.

The RAID volume 101 may further include one or more parity strips (e.g. $P_0$, $P_1$). The data value maintained in a given parity strip may be a logical XOR of all data strips on that stripe (e.g. P0=D0 XOR D1 XOR D2 XOR D3 XOR D4 XOR D5 XOR D6). Stripe 0 and stripe 1 represent the first two stripes of the logical volume. Stripes are in effect the rows.

The RAID volume 101 may include one or more stripes (e.g. Stripe 1, Stripe 2). A data stripe may include one or more data strips along with one or more parity strips.

During normal operation of the RAID storage system 100, a write request to any data strip on a given stripe may trigger an update of the data in the addressed strip as well as an update of the one or more parity strips associated with the one or more stripes which include the addressed data strip.

In a multi-host configuration, it may be the case that multiple hosts (e.g. host computing devices 103) attempt to access a given data strip in a substantially simultaneous manner. However, as referenced above, it order to maintain data integrity of the RAID volume 101, this access may only be granted in a manner such that only one of the host computing devices 103 may modify a given data or parity strip at a time.

As such, upon receipt of an I/O request from a given host computing device 103 to access (e.g. read and/or write operations) one or more data strips, various portions of the RAID volume 101 may be locked so as to restrict access by any other host computing device (or subsequent I/O request by the original requesting host computing device) to those portions of the RAID volume 101.

Figure 3:
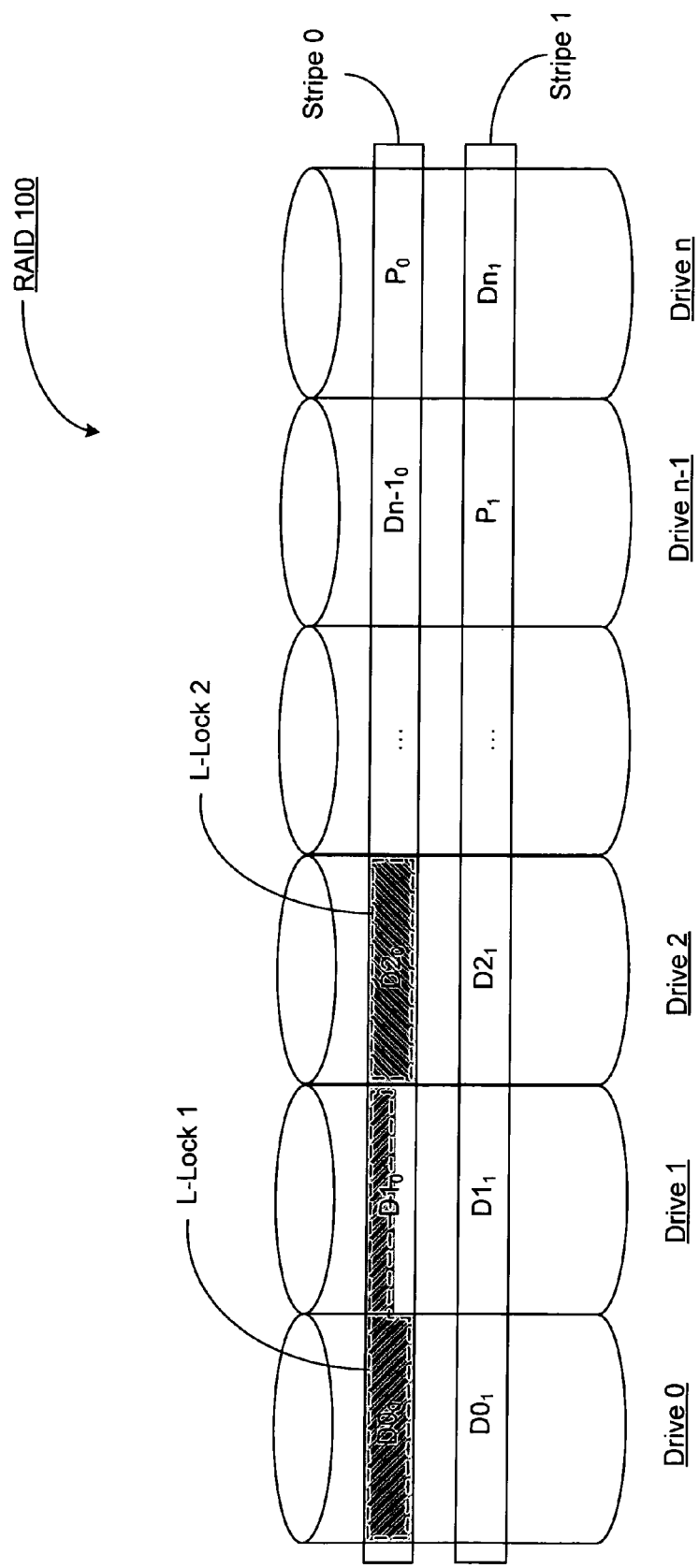
FIG. 3 shows a high-level system diagram for a RAID.

Referring to FIG. 3, an LBA-level logical locking (L-Lock) methodology is illustrated. The RAID volume 101 may receive an I/O request from one or more host computing devices 103 (e.g. host computing devices 103) directed to one more data strips. For example, as shown in FIG. 3, the RAID volume 101 may receive an I/O request from one or more host computing devices 103 directed to data strip $D0_0$ and a portion of data strip $D0_1$.

The shaded regions of data strip $D0_0$ and data strip $D1_0$ denote LBAs addressed by the I/O request from the host computing device 103A. L-Lock 1 may be applied to only the LBAs addressed by the I/O request and all other LBAs on the logical volume may remain free to be accessed by any other I/O request (e.g. subsequent requests to modify (e.g. write to) the data maintained in the LBAs associated with L-Lock 1 will be queued until processing of the first request is completed). Further, the shaded region of data strip $D2_0$ denotes LBAs addressed by a second I/O request either from the same host computing device 103A or a second host computing device 103B. L-Lock 2 may be applied to only the LBAs addressed by the I/O request and all other LBAs on the logical volume may remain free to be accessed by any other I/O request (e.g. subsequent requests to modify (e.g. write to) the data maintained in the LBAs associated with L-Lock 2 will be queued until processing of the first request is completed)

Figure 4:
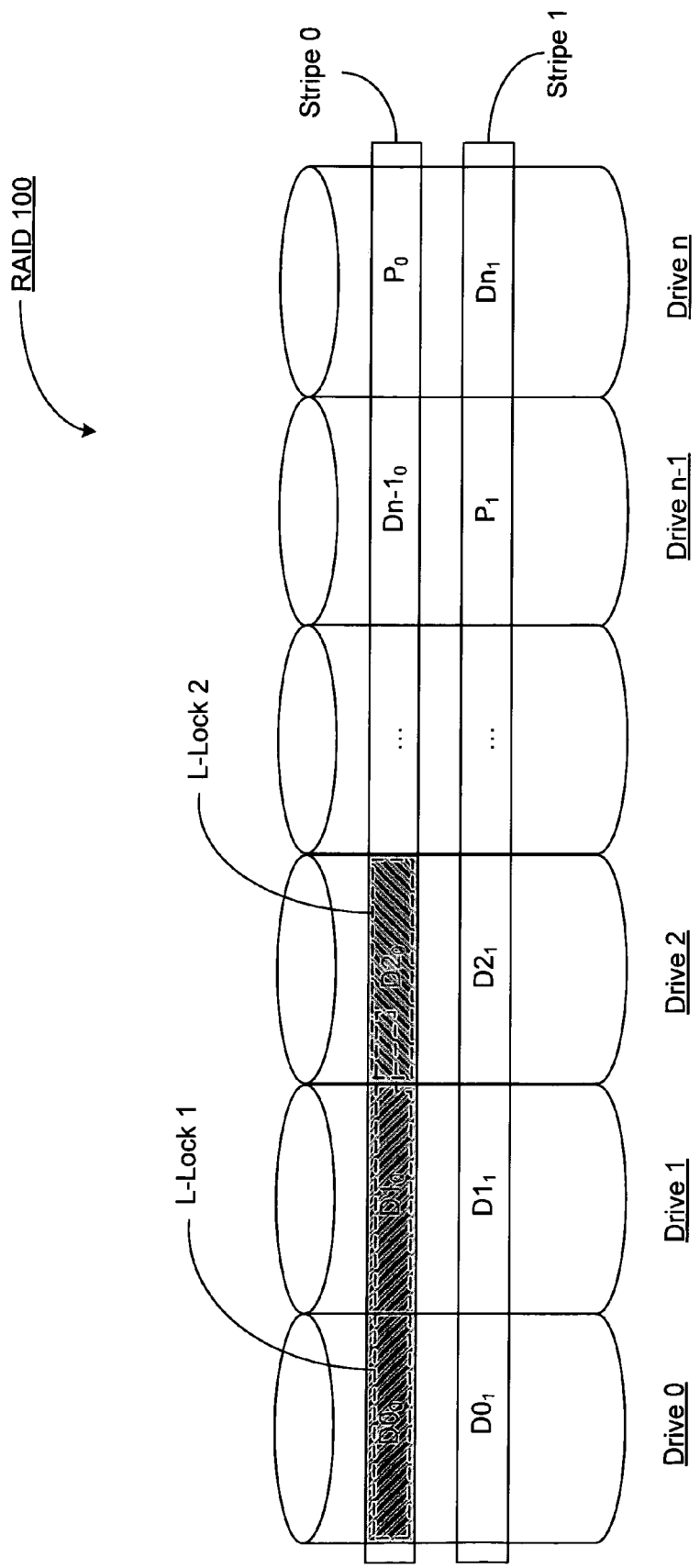
FIG. 4 shows a high-level system diagram for a RAID.

When multiple I/O requests are received which do not require modification of a parity strip (e.g. operations which do not modify the contents of the addressed LBAs, such as read operations, write-back write operations, and the like) such operations may be processed in a substantially simultaneous manner (e.g. at least part of the processing interval associated with a first operation may overlap temporally with at least part of the processing interval of a second operation). For example, as shown in FIG. 4, a first I/O request may be addressed to LBAs of data strip $D0_0$, data strip $D1_0$ and data strip $D2_0$ resulting in L-Lock 1. A second I/O request may be addressed to LBAs of to data strip $D2_0$ resulting in L-Lock 2. If the I/O request addressed to LBAs of data strip $D0_0$, data strip D10 and data strip $D2_0$ is a read operation and the I/O request addressed to the data strip $D2_0$ is a write-back write operation to a write-back cache, both I/O requests may be processed at least partially simultaneously. Alternately, if the I/O request addressed to LBAs of data strip $D0_0$, data strip D10 and data strip $D2_0$ is a write operation and the I/O request addressed to the data strip $D2_0$ is a read operation, the requests will be processed in the order in which they are received with the later in time request being queued until completion of the first request.

However, L-Locks may not be granted on a region until a physical lock (P-Lock) is active on that region or a part of that region, as will be discussed further below. The RAID controller 102 may maintain state information regarding the various types of locks (L-Lock or P-Lock) applied to various LBAs by each I/O request that is being processed by the RAID volume 101 and conflicting requests may be queued.

Figure 5:
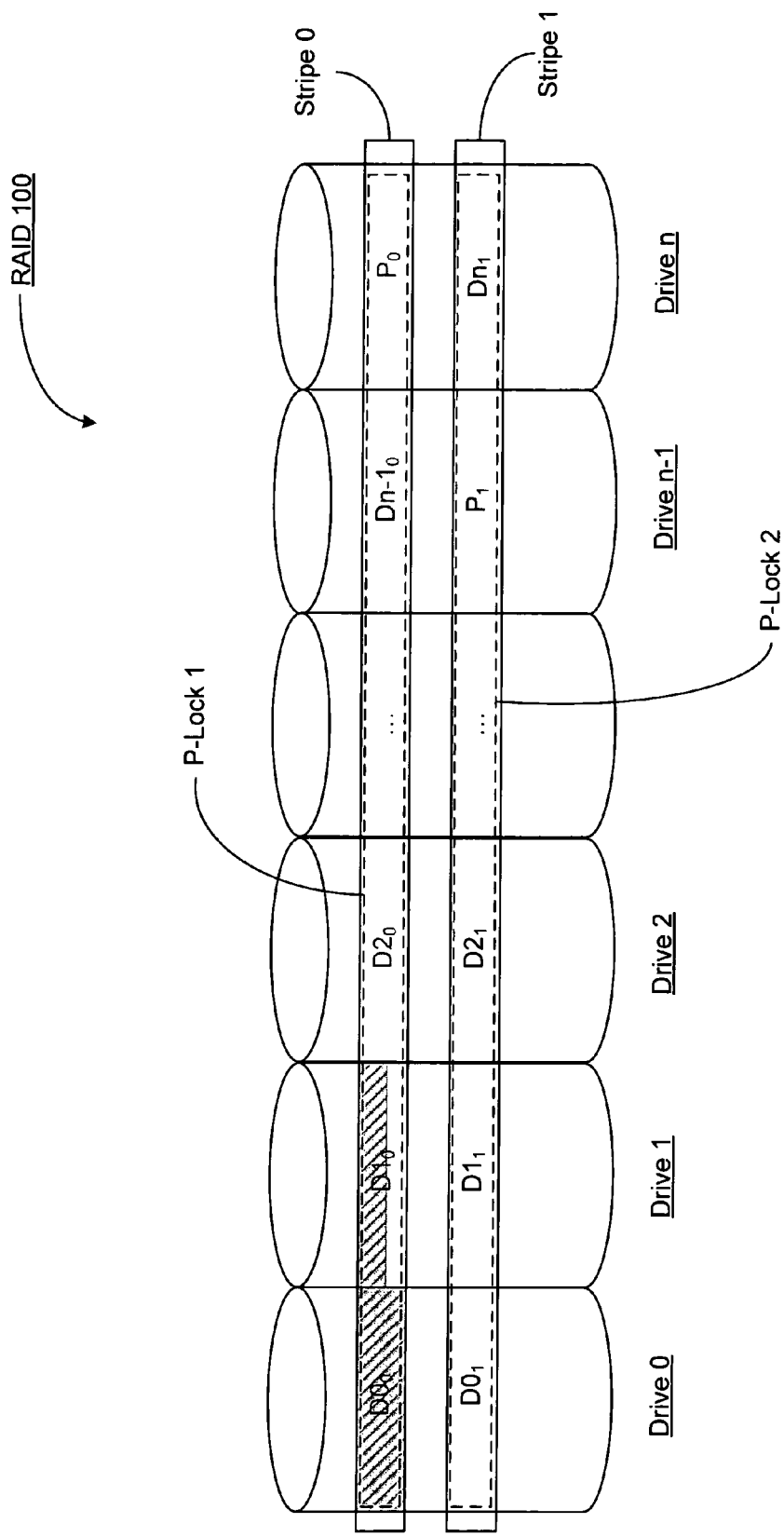
FIG. 5 shows a high-level system diagram for a RAID

Referring to FIG. 5, a P-Lock methodology is illustrated. A P-Lock methodology may include locking based on the physical layout of LBAs (e.g. a layout mapped on the RAID subsystem's internal view of the LBAs which is the physical distribution on the disks). Certain requests by the host computing devices 103 or various operations internal to the RAID volume 101 (e.g. consistency checks, rebuild/reconstructions operations, etc.) that require access to a range of LBAs spanning numerous physical drives, thereby necessitating the update of parity strips P0 and/or P1, may initiate the locking on an entire stripe (e.g. Stripe 1 or Stripe 2) so as to maintain data integrity.

The shaded region of data strip $D0_0$ and data strip $D1_0$ denotes the LBAs addressed by the I/O request from a host computing device 103. P-Locks may be applied according to the physical view of the drives as seen internally by the RAID controller 102. The RAID controller 102 may lock an entire stripe for the range of physical LBAs in the I/O request. For example, when an I/O request is received accessing data strip $D0_0$ and a portion of data strip $D1_0$, a P-Lock 1 may be applied to data strips $D0_0$ to $Dn-1_0$ and P0 of Stripe 0 in order to maintain data integrity. As such, any I/O request attempting to access blocks $D0_0$ to $Dn-1_0$ may be required to wait in queue for the P-Lock 1 to be released. Any other range of LBAs that lies outside of this P-Locked region (e.g. Stripe 2) may continue to be accessed in parallel by the host computing devices 103. P-Locks may be applied to write-through logical volumes, degraded RAID5/RAID6 logical volumes, partially degraded RAID6 logical volumes and any internal operations (e.g. recoveries, consistency check, rebuild, reconstruction, patrol read, etc). I/O requests addressing multiple data strips spanning across the aforementioned cases may require a P-Lock before that I/O request can be serviced. P-Locks may not be granted for a region if any other lock is currently active (either L or P) on that region or a part of that region.

Any lock that has been acquired must be released once the I/O processing is complete for the I/O request that initiates a lock. Whenever a lock is released, the RAID controller 102 may check the queue of pending I/O requests (from a host or internal to the RAID controller 102) on the region or part of region currently being released from the lock. If an I/O request is pending for the region which has been released, RAID controller 102 may grant a lock to the pending request only if there are no conflicting locks already in place.

Referring again to FIG. 5, P-Lock 1 and P-Lock 2 may lock Stripe 1 and Stripe 2, respectively. In the case where an I/O request addressing one or more data strips of Stripe 1 and Stripe 2 is waiting in queue, both P-Lock 1 and P-Lock 2 must be released prior to processing the I/O request. Should P-Lock 2 be released, the I/O waiting in queue may not be processed if the remaining lock P-Lock 1 maintains some degree of overlap in I/O range with P-Lock 2. Only when P-Lock 1 is released may the I/O request waiting in queue be granted access.

It may also be the case where a host read to on or more data strips must be recovered (e.g. recovery from a media error). In general a read operation may require the application of an L-Lock to the specific LBAs of data strip portions addressed by the host read request. However, upon detection of a media error resulting in the failure of the read request, in order to service the read request, the media error LBA may need to be recovered through use of the parity data maintained on a parity strip (e.g. $P_0$). In such a case, an L-Lock may be promoted to a P-Lock.

Figure 6:
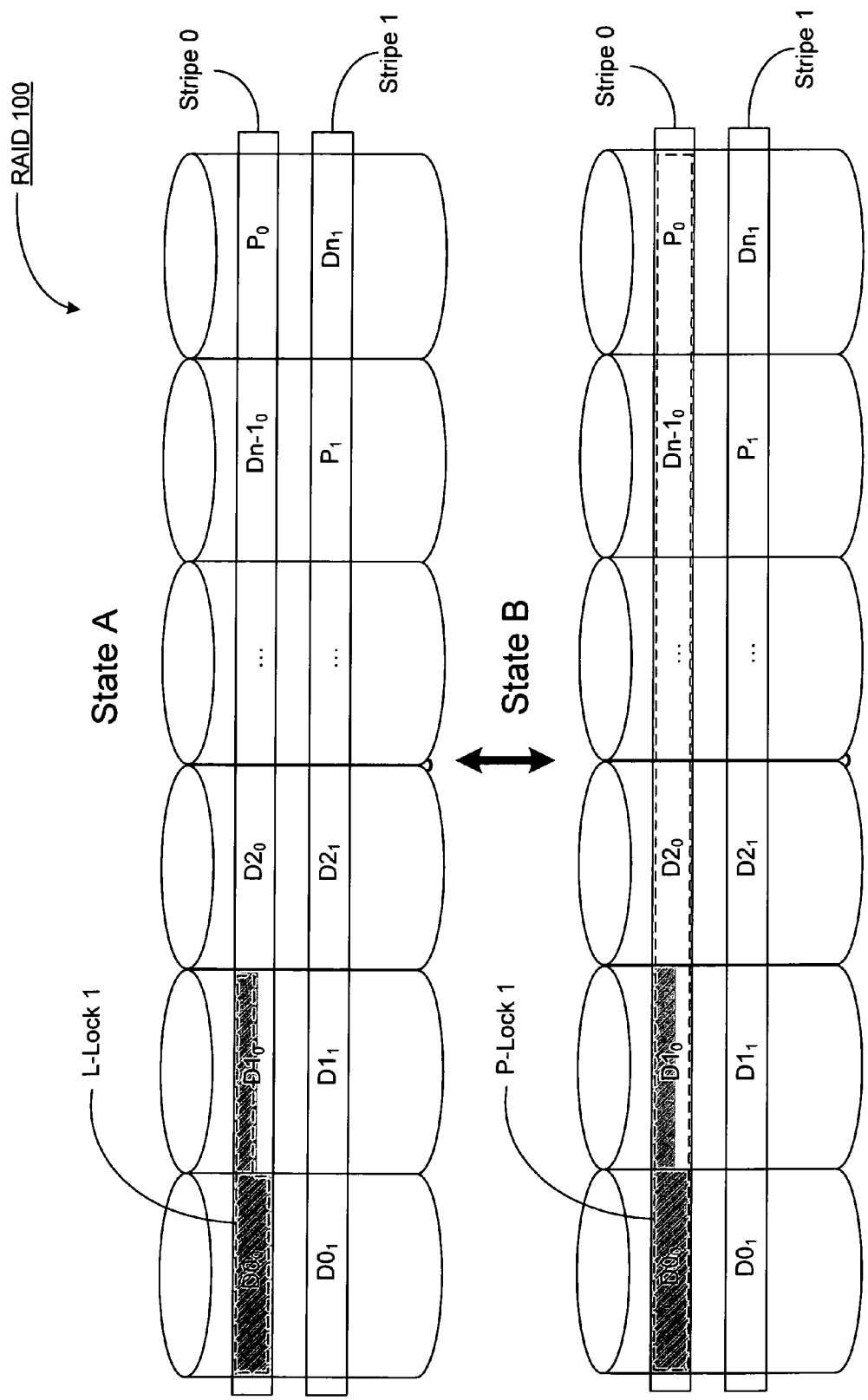
FIG. 6 shows a high-level system diagram for a RAID.

Referring to FIG. 6, when an I/O request directed to data strip $D0_0$ and data strip $D1_0$ as depicted in shaded region of Stripe 1, an L-Lock 1 to the addressed LBAs may be established (e.g. State A). While the I/O request is being serviced, a media error may be detected on Drive 1 or Drive 2 which disrupts the I/O request. Such a failure may necessitate the recovery of the data on the media error LBA via common RAID recovery processes. As such recovery processes may require data from other drives well (i.e. strips $D2_0 \ldots Dn-1_0$, $P_0$) the L-Lock 1 previously established for to data strip $D0_0$ and data strip $D1_0$ may be promoted to a P-Lock 1 across the entirety of Stripe 1 (e.g. State B), so as to maintain the consistency of the data on all drives during the recovery. Once the L-Lock 1 lock is promoted to P-Lock 1 no other I/O request may update any physical LBA on Strip 1. Upon completion of the recovery operation, the P-Lock 1 State B may revert back to L-Lock 1 of State A.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form hereinbefore described being merely an explanatory embodiment thereof. It may be the intention of the following claims to encompass and include such changes.

The invention claimed is:

1. A method for regulating I/O requests in a redundant array of inexpensive discs (RAID) volume, the method comprising:

determining a first set of one or more logical block addresses (LBAs) of a RAID volume stripe addressed by a first request not requiring access to a parity strip according to a logical layout of the LBAs as viewable by a host;

processing the first request not requiring access to a parity strip and addressing the first set of one or more LBAs of a RAID volume stripe;

determining a second set of one or more LBAs of the RAID volume stripe addressed by a second request not requiring access to a parity strip according to the logical layout of the LBAs as viewable by a host;

processing the second request not requiring access to a parity strip and addressing a second set of one or more LBAs of the RAID volume stripe and received during processing of the first request not requiring access to a parity strip at least partially simultaneous to the processing the first request not requiring access to a parity strip;

queuing a request requiring access to a parity strip and addressing one or more LBAs of the RAID volume stripe and received during the processing of at least one of the first request not requiring access to a parity stripe and the second request not requiring access to a parity stripe;

determining a RAID volume stripe addressed by the request requiring access to a parity strip according to a physical layout of the LBAs maintained internally by a RAID controller;

queuing all access requests addressing the RAID volume stripe previously addressed by the request requiring access to a parity strip that are received following the request requiring access to a parity strip;

processing the request requiring access to a parity strip following the processing of both the first request not requiring access to a parity strip and addressing the first set of one or more LBAs of the RAID volume stripe and the second request not requiring access to a parity strip and addressing the second set of one or more LBAs of the RAID volume stripe; and processing an access request addressing the RAID volume stripe received during the processing of the request requiring access to a parity strip following the processing of the request requiring access to a parity strip.

2. The method of claim 1, wherein the request requiring access to a parity strip includes a request selected from at least one of: a request to recover one or more data strips associated with the stripe including the parity strip; a request to reconstruct the stripe including the parity strip; a request to complete a consistency check on one or more data strips associated with the stripe including the parity strip; and a request to carry out a patrol read on one or more data strips associated with the stripe including the parity strip data.

3. A system for regulating I/O requests in a redundant array of inexpensive discs (RAID) volume, the system comprising:

means for determining a first set of one or more logical block addresses (LBAs) of a RAID volume stripe addressed by a first request not requiring access to a parity strip according to a logical layout of the LBAs as viewable by a host;

means for processing the first request not requiring access to a parity strip and addressing the first set of one or more LBAs of a RAID volume stripe;

means for determining a second set of one or more LBAs of the RAID volume stripe addressed by a second request not requiring access to a parity strip according to the logical layout of the LBAs as viewable by a host;

means for processing the second request not requiring access to a parity strip and addressing a second set of one or more LBAs of the RAID volume stripe and received during processing of the first request not requiring access to a parity strip at least partially simultaneous to the processing the first request not requiring access to a parity strip; and means for queuing a request requiring access to a parity strip and addressing one or more LBAs of the RAID volume stripe and received during the processing of at least one of the first request not requiring access to a parity stripe and the second request not requiring access to a parity stripe;

means for determining a RAID volume stripe addressed by the request requiring access to a parity strip according to a physical layout of the LBAs maintained internally by a RAID controller;

means for queuing all access requests addressing the RAID volume stripe previously addressed by the request requiring access to a parity strip that are received following the request requiring access to a parity strip;

means for processing the request requiring access to a parity strip following the processing of both the first request not requiring access to a parity strip and addressing the first set of one or more LBAs of the RAID volume stripe and the second request not requiring access to a parity strip and addressing the second set of one or more LBAs of the RAID volume stripe; and means for processing an access request addressing the RAID volume stripe received during the processing of the request requiring access to a parity strip following the processing of the request requiring access to a parity strip.

4. The system of claim 3, wherein the request requiring access to a parity strip includes a request selected from at least one of: a request to recover one or more data strips associated with the stripe including the parity strip; a request to reconstruct the stripe including the parity strip; a request to complete a consistency check on one or more data strips associated with the stripe including the parity strip; and a request to carry out a patrol read on one or more data strips associated with the stripe including the parity strip data.

5. A non-transitory computer readable medium including computer readable instructions for execution of a process on a computing device, the process comprising:

determining a first set of one or more logical block addresses (LBAs) of a RAID volume stripe addressed by a first request not requiring access to a parity strip according to a logical layout of the LBAs as viewable by a host;

processing the first request not requiring access to a parity strip and addressing the first set of one or more LBAs of a RAID volume stripe;

determining a second set of one or more LBAs of the RAID volume stripe addressed by a second request not requiring access to a parity strip according to the logical layout of the LBAs as viewable by a host;

processing the second request not requiring access to a parity strip and addressing a second set of one or more LBAs of the RAID volume stripe and received during processing of the first request not requiring access to a parity strip at least partially simultaneous to the processing the first request not requiring access to a parity strip;

queuing a request requiring access to a parity strip and addressing one or more LBAs of the RAID volume stripe and received during the processing of at least one of the first request not requiring access to a parity stripe and the second request not requiring access to a parity stripe;

determining a RAID volume stripe addressed by the request requiring access to a parity strip according to a physical layout of the LBAs maintained internally by a RAID controller;

queuing all access requests addressing the RAID volume stripe previously addressed by the request requiring access to a parity strip that are received following the request requiring access to a parity strip;

processing the request requiring access to a parity strip following the processing of both the first request not requiring access to a parity strip and addressing the first set of one or more LBAs of the RAID volume stripe and the second request not requiring access to a parity strip and addressing the second set of one or more LBAs of the RAID volume stripe; and processing an access request addressing the RAID volume stripe received during the processing of the request requiring access to a parity strip following the processing of the request requiring access to a parity strip.

* * * * *